(12) United States Patent
Lv et al.

(10) Patent No.: US 11,098,432 B2
(45) Date of Patent: Aug. 24, 2021

(54) DAMPING DEVICE FOR A WASHING MACHINE, AND WASHING MACHINE

(71) Applicants: HAIER SMART HOME CO., LTD., Shandong (CN); CHONGQING HAIER WASHING MACHINE CO., LTD., Chongqing (CN)

(72) Inventors: Peishi Lv, Shandong (CN); Lin Yang, Shandong (CN); Gangjin Zhang, Shandong (CN); Yun Tian, Shandong (CN); Chunxia Zhou, Shandong (CN); Shengcheng Gao, Shandong (CN)

(73) Assignees: CHONGQING HAIER WASHING MACHINE CO., LTD., Chongqing (CN); HAIER SMART HOME CO., LTD., Shandong (CN)

( * ) Notice: Subject to any disclaimer, the term of this patent is extended or adjusted under 35 U.S.C. 154(b) by 118 days.

(21) Appl. No.: 16/348,358

(22) PCT Filed: Nov. 10, 2017

(86) PCT No.: PCT/CN2017/110402
§ 371 (c)(1),
(2) Date: May 8, 2019

(87) PCT Pub. No.: WO2018/086579
PCT Pub. Date: May 17, 2018

(65) Prior Publication Data
US 2020/0056316 A1 Feb. 20, 2020

(30) Foreign Application Priority Data
Nov. 10, 2016 (CN) .......................... 201610992453.6

(51) Int. Cl.
*D06F 37/20* (2006.01)
*D06F 37/26* (2006.01)
(Continued)

(52) U.S. Cl.
CPC ............ *D06F 37/20* (2013.01); *D06F 37/268* (2013.01); *F16F 1/06* (2013.01); *F16F 7/082* (2013.01);
(Continued)

(58) Field of Classification Search
CPC ........ D06F 37/268; D06F 37/20; D06F 37/22; D06F 37/24; F16F 1/06; F16F 15/04;
(Continued)

(56) References Cited

U.S. PATENT DOCUMENTS

| 3,744,746 A | * | 7/1973 | Weir | ....................... D06F 37/24 248/569 |
| 6,286,344 B1 | | 9/2001 | Jeon et al. | |
| 2003/0183994 A1 | * | 10/2003 | Atwater | ................ F16F 15/022 267/71 |

(Continued)

FOREIGN PATENT DOCUMENTS

| CN | 1262353 A | 8/2000 |
| CN | 104246052 A | 12/2014 |

(Continued)

OTHER PUBLICATIONS

International Search Report (PCT/ISA/210) and Written Opinion (PCT/ISA/237) dated Feb. 14, 2018, by the Chinese Patent Office as the International Searching Authority for International Application No. PCT/CN2017/110402.

*Primary Examiner* — Joseph L. Perrin
(74) *Attorney, Agent, or Firm* — Buchanan Ingersoll & Rooney PC

(57) ABSTRACT

A damping device for a washing machine and a washing machine are provided. The damping device for a washing machine comprises an upper boom, a damping spring mechanism and a lower boom, wherein an upper end of the upper boom is installed on a cabinet of the washing machine, a lower end of the lower boom is installed on an outer tub of the washing machine, the damping spring mechanism is installed between the upper boom and the lower boom, and the upper boom and/or the lower boom are/is elastically stretched under the drive of the damping spring mechanism.

20 Claims, 4 Drawing Sheets

(51) Int. Cl.
　　　*F16F 1/06*　　　(2006.01)
　　　*F16F 15/067*　　(2006.01)
　　　*F16F 7/09*　　　(2006.01)
　　　*F16F 7/08*　　　(2006.01)
　　　*D06F 37/22*　　 (2006.01)
　　　*D06F 37/24*　　 (2006.01)

(52) U.S. Cl.
　　　CPC .............. *F16F 7/09* (2013.01); *F16F 15/067*
　　　　　　(2013.01); *D06F 37/22* (2013.01); *D06F 37/24*
　　　　　　　　　　(2013.01); *F16F 2232/08* (2013.01)

(58) Field of Classification Search
　　　CPC .. F16F 15/067; F16F 7/09; F16F 7/082; F16F
　　　　　　　　　　　　　　　　　　　　　　　　　2232/08
　　　See application file for complete search history.

(56) References Cited

U.S. PATENT DOCUMENTS

2011/0167878 A1*　7/2011　De Angelo Sanchez ....................
　　　　　　　　　　　　　　　　　　　　　　　D06F 37/24
　　　　　　　　　　　　　　　　　　　　　　　　　68/212
2015/0069684 A1　　3/2015　Park et al.
2016/0083888 A1*　3/2016　Alexander .............. D06F 37/24
　　　　　　　　　　　　　　　　　　　　　　　　　68/132

FOREIGN PATENT DOCUMENTS

| CN | 105839348 | A | 8/2016 |
| CN | 108070985 | A | 5/2018 |
| JP | 3907646 | B2 | 4/2007 |
| WO | 2018086579 | A1 | 5/2018 |

* cited by examiner

DAMPING DEVICE FOR A WASHING MACHINE, AND WASHING MACHINE

TECHNICAL FIELD

The present disclosure relates to the technical field of damping of a washing machine, in particular to a damping device for a washing machine and a washing machine.

BACKGROUND

When dehydration of a full-automatic washing machine is started and operated, an outer tub will shake or swing along with the starting of a motor, thereby generating greater vibration and noise. Therefore, in order to weaken vibration and noise of the washing machine during dehydration, the existing full-automatic washing machines are generally provided with a damping device, wherein one end of a boom of a damping device is installed on a cabinet of a washing machine, while the other end of the boom is hanged on a hanging seat of an outer tub of the washing machine; the damping device includes a damping spring mechanism, and when the outer tub shakes or swings, eccentricity of the outer tub is alleviated through a buffering effect of the damping spring mechanism, thereby achieving the aim of damping.

A damping spring mechanism of the existing damping device for a washing machine is generally arranged at the end for hanging an outer tub of a washing machine on a boom. In consideration of installation of the damping spring mechanism, a corresponding installation structure needs to be designed on an outer tub of a washing machine, and the structural design of the outer tub is relatively complicated and the space of the outer tub is occupied to a certain degree. In addition, since the damping spring mechanism is designed to be close to the outer tub, during a dehydration process of a washing machine, the outer tub will interfere with the damping spring mechanism while swinging along with starting of dehydration.

In view of this, the present disclosure is hereby proposed.

SUMMARY

In order to solve the above problem, the first objective of the present disclosure is to provide a damping device for a washing machine, in particular, the following technical solution is adopted.

A damping device for a washing machine includes an upper boom, a damping spring mechanism and a lower boom, wherein an upper end of the upper boom is installed on a cabinet of the washing machine, a lower end of the lower boom is installed on an outer tub of the washing machine, the damping spring mechanism is installed between the upper boom and the lower boom, and the upper boom and/or the lower boom are/is elastically stretched under the drive of the damping spring mechanism.

Further, the upper boom is shorter than or equal to the lower boom, the damping spring mechanism is connected with the lower boom; and the lower boom is elastically stretched under the drive of the damping spring mechanism.

Further, a lower end of the upper boom is connected with a support seat, the damping spring mechanism is installed on the support seat, an upper end of the lower boom is connected with the damping spring mechanism, and the lower boom is elastically stretched under the drive of the damping spring mechanism.

Further, the upper boom includes multiple upper branch booms, upper ends of the upper branch booms are respectively installed on a cabinet of a washing machine or are converged together and installed on a cabinet of a washing machine, lower ends of the upper branch booms are respectively installed along a circumferential direction of a support seat, and the upper branch booms encircle a space configured to accommodate the damping spring mechanism.

Further, the upper boom also includes a main upper boom, wherein an upper end of the main upper boom is installed on a cabinet of the washing machine, and upper ends of the upper branch boom are respectively fixedly connected with a lower end of the main upper boom.

Preferably, the upper boom includes a main upper boom, a first branch upper boom and a second branch upper boom, wherein the first branch upper boom is an L-shaped rod formed by bending a lower end of the main upper boom, while the second branch upper boom is an L-shaped rod fixedly connected with the main upper boom.

Further, the support seat is provided with multiple mounting holes, the mounting holes are respectively corresponding to the upper branch booms, lower ends of the upper branch booms are respectively installed within the mounting hole in a limiting manner, and a gasket is arranged between the upper branch boom and the mounting hole.

Further, the support seat is provided with an open chamber, one end of the damping spring mechanism is arranged inside the chamber, a bottom wall of the chamber is provided with a through hole, and the lower boom penetrates through the through hole and is connected with the damping spring mechanism.

Further, the damping spring mechanism includes a shell and a damping spring arranged in the shell, one end of the damping spring ends at and is abutted within the shell, and the other end of the spring is connected with a spring seat; and one end of the shell is fixedly installed inside the chamber of the support seat, and the lower boom extends into the shell and is connected with the spring seat.

Further, an upper end of the lower boom is connected with a support seat, the damping spring mechanism is installed on the support seat, a lower end of the upper boom is connected with the damping spring mechanism, and the upper boom is elastically stretched under the drive of the damping spring mechanism; and the upper boom and the lower boom are respectively connected with the damping spring of the damping spring mechanism, and the upper boom and the lower boom are elastically stretched under the drive of the damping spring mechanism.

A second objective of the present disclosure is to provide a washing machine, specifically, the following technical solution is adopted:

A washing machine provided with a damping device for a washing machine mentioned in any of the above items is provided.

The damping device for a washing machine of the present disclosure includes an upper boom and a lower boom, a damping spring mechanism is installed between the upper boom and the lower boom, such that the damping spring mechanism can be arranged in the middle or even in the part close to the upper end in the middle, and the damping device for a washing machine has the following beneficial effects:

1. Fewer parts are arranged at two end parts of a damping device for a washing machine, the size is also small, and the space of an outer tub of a washing machine is not occupied.

2. A hanging position of the damping device on an outer tub of a washing machine can be made small, meanwhile, the height of the outer tub can also be increased, thereby increasing the volume of an outer tub and rated capacity of the washing machine.

3. The damping spring mechanism is arranged in the middle, thereby avoiding direct contact with an outer tub, and the outer tub will not interfere with a damping spring mechanism while swinging along with starting of dehydration.

Figure 1:
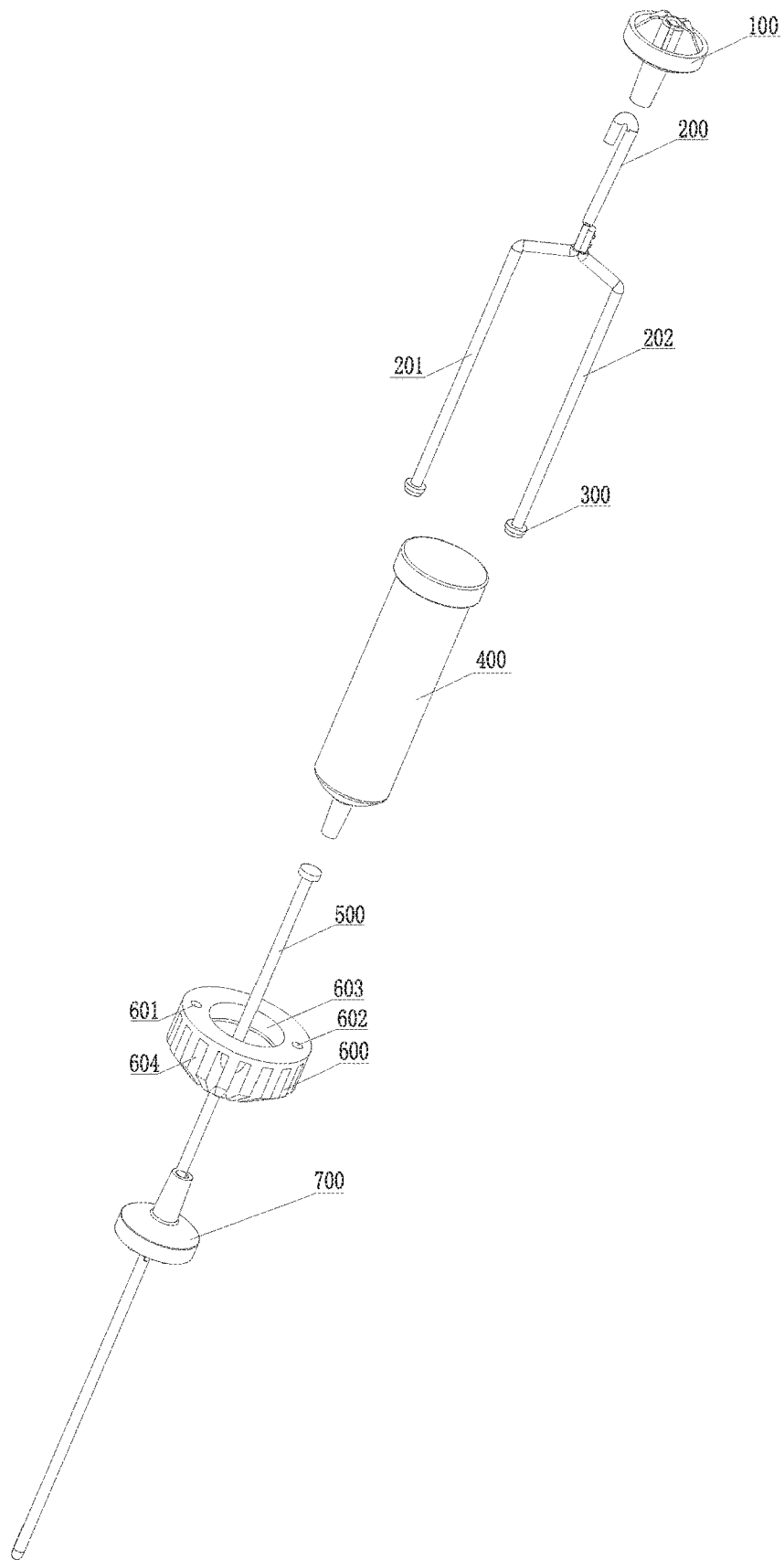
FIG. 1 is an exploded view of a damping device for a washing machine of the present disclosure.

Reference numerals in the figures: 100—upper boom seat 200—main upper boom 201—first branch boom 202—second branch boom 300—gasket 400—damping spring mechanism 401—shell 402—damping spring 403—spring seat 404—bottom shell 500—lower boom 600—support seat 601—first mounting hole 602—second mounting hole 603—chamber 604—reinforcing rib 700—lower boom seat

DETAILED DESCRIPTION OF THE EMBODIMENTS

Figure 2:
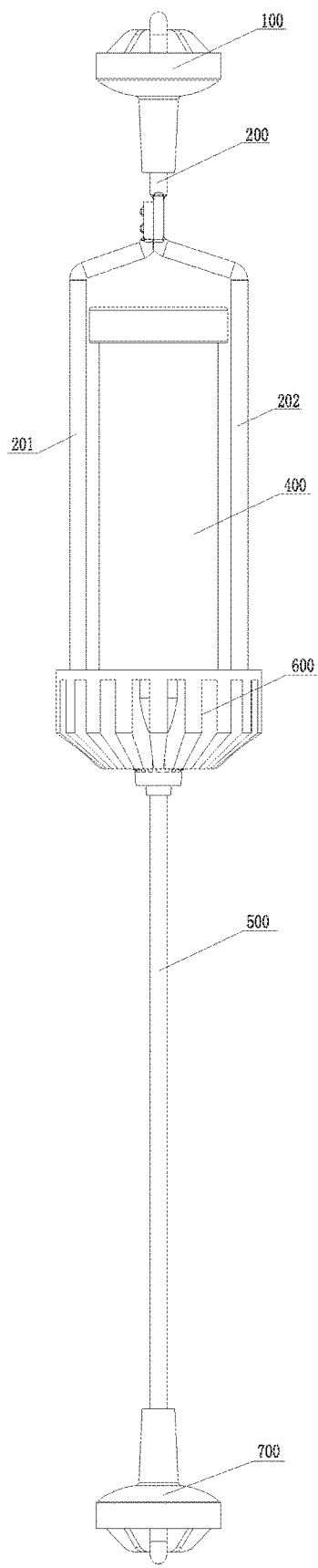
FIG. 2 is a front view of a damping device for a washing machine of the present disclosure.
Figure 3:
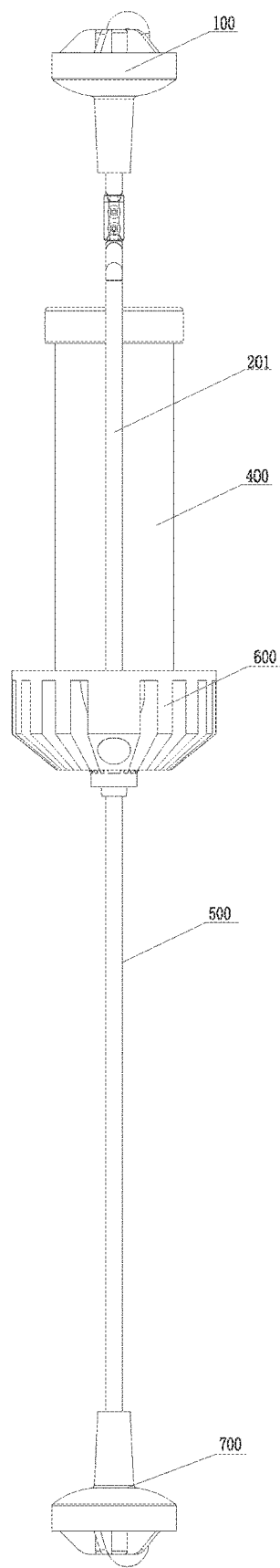
FIG. 3 is a left view of a damping device for a washing machine of the present disclosure.
Figure 4:
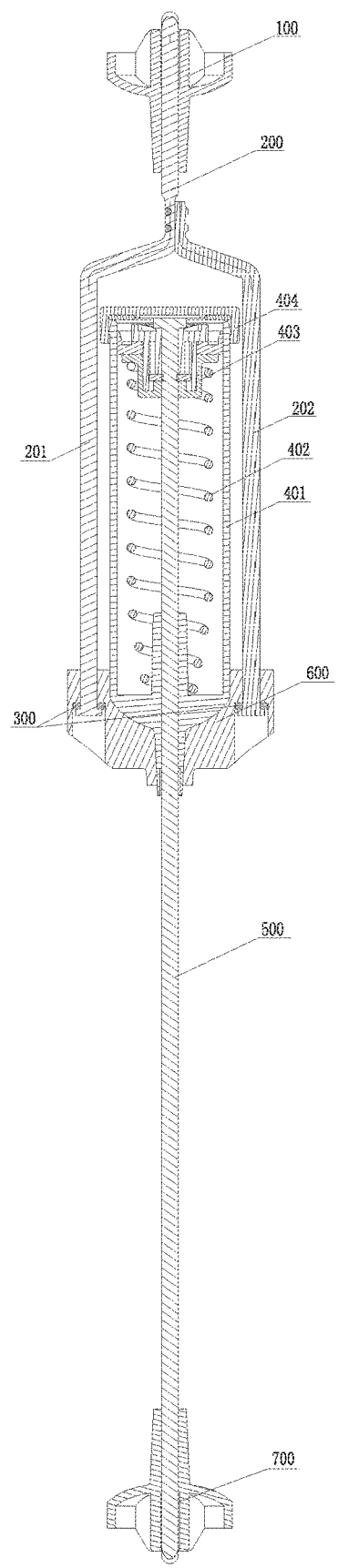
FIG. 4 is a sectional view of a damping device for a washing machine of the present disclosure.

A detailed description will be given below on a damping device for a washing machine and a washing machine of the present disclosure in combination with accompanying drawings:

As shown in FIG. 1 to FIG. 4, a damping device for a washing machine in the present embodiment includes an upper boom, a damping spring mechanism 400 and a lower boom 500. An upper end of the upper boom is installed on a cabinet of the washing machine, a lower end of the lower boom is installed on an outer tub of the washing machine, the damping spring mechanism is installed between the upper boom and the lower boom 500, and the upper boom and/or the lower boom 500 are or is elastically stretched under the drive of the damping spring mechanism 400.

The damping device for a washing machine of the present embodiment includes an upper boom and a lower boom 500, a damping spring mechanism 400 is installed between the upper boom and the lower boom 500, such that the damping spring mechanism 400 can be arranged in the middle or even in the part close to the upper end in the middle, and the damping device for a washing machine has the following beneficial effects:

1. Fewer parts are arranged at two end parts of a damping device for a washing machine, the size is also small, and the space of an outer tub of a washing machine is not occupied.

2. A hanging position of the damping device on an outer tub of a washing machine can be made small, meanwhile, the height of the outer tub can also be increased, thereby increasing the volume of an outer tub and rated capacity of the washing machine.

3. The damping spring mechanism 400 is arranged in the middle, thereby avoiding direct contact with an outer tub, and the outer tub will not interfere with a damping spring mechanism while swinging along with starting of dehydration.

As to a damping device for a washing machine in the present embodiment, the spring damping spring mechanism 400 is arranged in the middle position of the whole damping device for a washing machine, therefore, damping can be realized through elastic stretching of the upper boom and/or the lower boom 500.

As a preferred implementation of the present embodiment, the upper boom of the present embodiment is shorter than or equal to the lower boom 500. The damping spring mechanism 400 is connected with the lower boom 500 and the lower boom 500 is elastically stretched under the drive of the damping spring mechanism 400.

In the present embodiment, the damping spring mechanism 400 is arranged in an upper position in the middle of the whole damping device for a washing machine, such that the damping spring mechanism 400 is far away from an outer tub, thereby avoiding interference. In addition, the lower boom 500 is directly connected with the outer tub, and when the outer tub is subjected to eccentric shaking or swinging, the lower boom 500 is elastically stretched under the drive of the damping spring mechanism 400, therefore, damping is more timely and effective.

Further, a lower end of the upper boom of the present embodiment is connected with a support seat 600, the damping spring mechanism 400 is installed on the support seat 600, an upper end of the lower boom 500 is connected with the damping spring mechanism, and the lower boom 500 is elastically stretched under the drive of the damping spring mechanism 400.

In the present embodiment, an upper boom is connected with a support seat 600 and the support seat 600 supports a damping spring mechanism 400, thereby realizing installation of the damping spring mechanism 400. As a separate component, the support seat 600 is directly installed on the upper boom, thereby being convenient for installation and fixation of the damping spring mechanism 400, and possessing a stable damping effect.

Further, the upper boom includes multiple upper branch booms, upper ends of the upper branch booms are respectively installed on a cabinet of a washing machine or are converged together and then installed on a cabinet of a washing machine. Lower ends of the upper branch booms are respectively installed along a circumferential direction of a support seat 600, and the upper branch booms encircle a space configured to accommodate the damping spring 400.

The upper boom of the present embodiment includes multiple upper branch booms, and multiple branch booms are installed at equal intervals along a circumferential direction, such that the support seat 600 maintains a uniform circumferential stress, the installation of the damping spring mechanism 400 is more stable, and the damping effect is better.

Further, the upper boom also includes a main upper boom 200, wherein an upper end of the main upper boom 200 is installed on a cabinet of a washing machine, while upper ends of the upper branch boom are respectively fixedly connected with a lower end of the main upper boom. Each of the upper branch booms of the present embodiment is respectively connected with the main upper boom 200. In this way, only the main upper boom 200 only needs to be installed on a cabinet of a washing machine, therefore, the installation is more convenient.

Preferably, the upper boom includes a main upper boom 200, a first branch upper boom 201 and a second branch upper boom 202. The first branch upper boom 201 is an L-shaped rod formed by bending a lower end of a main upper boom 200, while the second branch upper boom 202 is an L-shaped rod fixedly connected with the main upper boom 200. An area for placing the damping spring mechanism 400 is formed between two L-shaped branch upper booms in the present embodiment, and the damping spring mechanism 400 is located between the two branch upper booms, therefore, the stress is more uniform and the damping effect is better.

The second branch upper boom 202 and the main upper boom 200 of the present embodiment are fixedly connected via a bolt. Preferably, the part at which the second branch upper boom 202 is connected with the main upper boom 200 via a bolt is of a flat structure, so as to facilitate fixation and fastening between the second branch upper boom 202 and the main upper boom 200.

Further, the support seat 600 is provided with multiple mounting holes, the mounting holes are respectively corresponding to the upper branch booms, lower ends of the upper branch booms are respectively installed within the mounting hole in a limiting manner, and a gasket 300 is arranged between the upper branch boom and the mounting hole. The gasket 300 between the upper branch boom and the support seat 600 in the present embodiment can prevent mutual abrasion between the two, and plays a certain role of damping.

Specifically, the support seat 600 is provided with a first mounting hole 601 configured to install a first branch upper boom 201 and a second mounting hole 602 configured to install a second branch upper boom 202.

Further, the present embodiment discloses an assembly method between the support seat 600 and the damping spring mechanism 400. The support seat 600 of the present embodiment is provided with an open chamber 603, one end of the damping spring mechanism 400 is arranged inside the chamber 603, a bottom wall of the chamber 603 is provided with a through hole, and the lower boom 500 penetrates through the through hole and is connected with the damping spring mechanism 400. Preferably, the support seat 600 of the present embodiment is a support seat of an annular structure. An outer wall of the support seat 600 of the present embodiment is provided with a reinforcing rib 604, so as to enhance its overall strength.

Specifically, the damping spring mechanism 400 of the present embodiment includes a shell 401 and a damping spring 402 arranged inside the shell 401, wherein one end of the damping spring 402 ends at and is abutted within the shell 401, another end of the spring is connected with a spring seat 403. And one end of the shell 401 is fixedly installed within an chamber 603 of the support seat 600, and the lower boom 500 extends into the shell 401 and is connected with the spring seat 403.

The shell 401 of the present embodiment includes a cover shell and a bottom shell 404, wherein a closed chamber is formed between the cover shell and the bottom shell 404, and the damping spring 402 and the spring seat 403 are arranged inside the closed chamber and can slide up and down under the limiting of an inner wall of the closed chamber.

As a preferred implementation of the present embodiment, an upper end of the lower boom 500 of the present embodiment is connected with a support seat 600, the damping spring mechanism 400 is installed on the support seat 600, a lower end of the upper boom is connected with the damping spring mechanism 400, and the upper boom is elastically stretched under the drive of the damping spring mechanism 400.

As a preferred implementation of the present embodiment, the upper boom and the lower boom 500 are respectively connected with the damping spring of the damping spring mechanism 400, and the upper boom and the lower boom 500 are elastically stretched under the drive of the damping spring mechanism 400.

The present embodiment simultaneously provides a washing machine provided with the damping device for a washing machine mentioned in any of the above items, and the washing machine in the present embodiment has the following advantages:

1. Internal volume is increased under the premise of ensuring an unchangeable diameter of an outer tub.

2. An interference between an outer tub and a damping device for a washing machine during a dehydration process is avoided, therefore, the process of dehydration is more stable.

The above descriptions are merely preferred embodiments of the present disclosure, rather than a limitation to the present disclosure in any form. Although the present disclosure is disclosed above through the preferred embodiments, however, the present disclosure is not limited hereto. Those skilled in the art can make some changes or modify to equivalent embodiments with equivalent changes by utilizing the technical contents enlightened above under the premise of not departing from the scope of the technical solution of the present disclosure. As long as the contents do not depart from the technical solution of the present disclosure, any simple alterations, equivalent changes and modifications made to the above embodiments according to the technical essence of the present disclosure shall still fall within the scope of the solution of the present disclosure.

The invention claimed is:

1. A damping device for a washing machine, comprising, an upper boom having upper branch booms,
a lower boom,
a support seat arranged between the upper booms and the lower boom, being connected with lower ends of the upper booms, and
a damping spring element arranged on the support seat,
wherein, an upper end of the upper boom is configured to be installed on a cabinet of the washing machine, a lower end of the lower boom is configured to be installed on an outer tub of the washing machine, and at least one of the upper boom and the lower boom is configured to be relatively moved under an action of the damping spring element,
the support seat is provided with mounting holes respectively corresponding to the upper branch booms, lower ends of the upper branch booms are respectively installed within the mounting holes in a limiting manner, and a gasket is arranged between each of the upper branch booms and each of the mounting holes.

2. The damping device for a washing machine of claim 1, wherein the upper boom is shorter than or equal to the lower boom, the damping spring element is connected with the lower boom; and the lower boom is configured to be driven to be relatively moved by the damping spring element.

3. The damping device for a washing machine of claim 2, wherein an upper end of the lower boom is connected with the damping spring element, and the lower boom is configured to be relatively moved under the drive of the damping spring element.

4. The damping device for a washing machine of claim 3, wherein upper ends of the upper branch booms are configured to be respectively installed on the cabinet of the washing machine or are converged together and configured to be installed on the cabinet of the washing machine, the lower ends of the upper branch booms are respectively installed along a circumferential direction of the support seat, and the upper branch booms encircle a space configured to accommodate the damping spring element.

5. The damping device for a washing machine of claim 4, wherein the upper boom comprises a main upper boom, wherein an upper end of the main upper boom is configured to be installed on the cabinet of the washing machine, and the upper ends of the upper branch booms are respectively fixedly connected with a lower end of the main upper boom.

6. The damping device for a washing machine of claim 5, the upper boom comprises a main upper boom, a first branch upper boom and a second branch upper boom, wherein the first branch upper boom is an L-shaped rod formed by a bent lower end of a main upper boom, and the second branch upper boom is an L-shaped rod fixedly connected with the main upper boom.

7. The damping device for a washing machine of claim 3, wherein the support seat is provided with an open chamber, one end of the damping spring element is arranged inside the open chamber, a bottom wall of the chamber is provided with a through hole, and the lower boom penetrates through the through hole and is connected with the damping spring element.

8. The damping device for a washing machine of claim 1, wherein an upper end of the lower boom is connected with the damping spring element, and the lower boom is configured to be relatively moved under a drive of the damping spring element.

9. The damping device for a washing machine of claim 8, wherein the support seat is provided with an open chamber, one end of the damping spring element is arranged inside the open chamber, a bottom wall of the chamber is provided with a through hole, and the lower boom penetrates through the through hole and is connected with the damping spring element.

10. The damping device for a washing machine of claim 9, wherein the damping spring element comprises a shell and a damping spring arranged in the shell, a first end of the damping spring is abutted within the shell, and a second end of the damping spring is connected with a spring seat; and
one end of the shell is fixedly installed inside the open chamber of the support seat, and the lower boom extends into the shell and is connected with the spring seat.

11. The damping device for a washing machine of claim 8, wherein upper ends of the upper branch booms are configured to be respectively installed on the cabinet of the washing machine or are converged together and configured to be installed on the cabinet of the washing machine, the lower ends of the upper branch booms are respectively installed along a circumferential direction of the support seat, and the upper branch booms encircle a space configured to accommodate the damping spring element.

12. The damping device for a washing machine of claim 11, wherein the upper boom comprises a main upper boom, wherein an upper end of the main upper boom is configured to be installed on the cabinet of the washing machine, and the upper ends of the upper branch booms are respectively fixedly connected with a lower end of the main upper boom.

13. The damping device for a washing machine of claim 12, wherein the upper boom comprises a main upper boom, a first branch upper boom and a second branch upper boom, wherein the first branch upper boom is an L-shaped rod formed by a bent lower end of a main upper boom, and the second branch upper boom is an L-shaped rod fixedly connected with the main upper boom.

14. The damping device for a washing machine of claim 1, wherein the upper end of the lower boom is connected with the support seat, the damping spring element is installed on the support seat, the lower end of the upper branch booms are connected with the damping spring element, and the upper boom is configured to be relatively moved under the action of the damping spring element; and
the upper boom and the lower boom are respectively connected with the damping spring of the damping spring element, and the upper boom and the lower boom are configured to be relatively moved under the action of the damping spring element.

15. A washing machine including a damping device, the damping device, comprising:
an upper boom having upper branch booms,
a lower boom,
a support seat arranged between the upper booms and the lower boom, being connected with lower ends of the upper booms, and
a damping spring element arranged on the support seat,
wherein, an upper end of the upper boom is configured to be installed on a cabinet of the washing machine, a lower end of the lower boom is configured to be installed on an outer tub of the washing machine, and at least one of the upper boom and the lower boom is configured to be relatively moved under an action of the damping spring element,
the support seat is provided with mounting holes respectively corresponding to the upper branch booms, lower ends of the upper branch booms are respectively installed within the mounting holes in a limiting manner, and a gasket is arranged between each of the upper branch booms and each of the mounting holes.

16. The washing machine of claim 15, wherein the upper end of the lower boom is connected with the support seat, the damping spring element is installed on the support seat, the lower end of the upper branch booms are connected with the damping spring element, and the upper boom is configured to be relatively moved under the action of the damping spring element; and
the upper boom and the lower boom are respectively connected with the damping spring of the damping spring element, and the upper boom and the lower boom are configured to be relatively moved under the action of the damping spring element.

17. The washing machine of claim 15, wherein the upper boom is shorter than or equal to the lower boom, the damping spring element is connected with the lower boom; and the lower boom is configured to be driven to be relatively moved by the damping spring element.

18. The washing machine of claim 15, wherein an upper end of the lower boom is connected with the damping spring element, and the lower boom is configured to be relatively moved under a drive of the damping spring element.

19. The washing machine of claim 15, wherein upper ends of the upper branch booms are respectively installed on the cabinet of the washing machine or are converged together and installed on the cabinet of the washing machine, the lower ends of the upper branch booms are respectively installed along a circumferential direction of the support seat, and the upper branch booms encircle a space configured to accommodate the damping spring element.

20. The washing machine of claim 15, wherein the upper boom comprises a main upper boom, wherein an upper end of the main upper boom is installed on the cabinet of the washing machine, and the upper ends of the upper branch booms are respectively fixedly connected with a lower end of the main upper boom.

* * * * *